United States Patent
Gillund et al.

[15] 3,703,300
[45] Nov. 21, 1972

[54] VARIABLE CAPACITOR CRASH SENSOR

[72] Inventors: Arden G. Gillund, Oak Creek; Dan K. Holtshouse, Milwaukee; John A. Moretti; Vincent A. Orlando, both of Greendale, all of Wis.

[73] Assignee: General Motors Corporation, Detroit, Mich.

[22] Filed: July 2, 1971

[21] Appl. No.: 159,169

[52] U.S. Cl. ............280/150 AB, 180/91, 317/246, 73/517, 293/1
[51] Int. Cl. .................................................B60r 21/08
[58] Field of Search...............180/82, 91, 99, 103; 280/150 AB; 340/61, 52 H, 262; 73/518, 517; 324/176; 317/246; 293/4, 1

[56] References Cited

UNITED STATES PATENTS

| | | |
|---|---|---|
| 2,025,719 | 12/1935 | Blau et al. ............73/517 R X |
| 3,172,684 | 3/1965 | Isaac ....................280/150 AB |
| 3,495,474 | 2/1970 | Nishimura et al........180/91 X |
| 3,560,922 | 2/1971 | Wilson.........................340/61 |
| 3,596,592 | 8/1971 | Trissnak et al. ...........317/246 |
| 3,633,159 | 1/1972 | Dillman et al. ..............180/91 |

*Primary Examiner*—Kenneth H. Betts
*Assistant Examiner*—George Steube
*Attorney*—Eugene W. Christen et al.

[57] ABSTRACT

A pair of electro-mechanical sensors mounted between the vehicle bumper and frame exhibit a capacitance related to the position of the bumper relative to the frame. During a collision, the changing capacitance of the sensors is detected by control circuitry to determine the velocity of the bumper relative to the frame at impact. If the velocity at impact is greater than a predetermined value for a predictable interval of time, where the predictable interval of time varies with the velocity at impact, a signal is provided for inflating a cushion.

7 Claims, 6 Drawing Figures

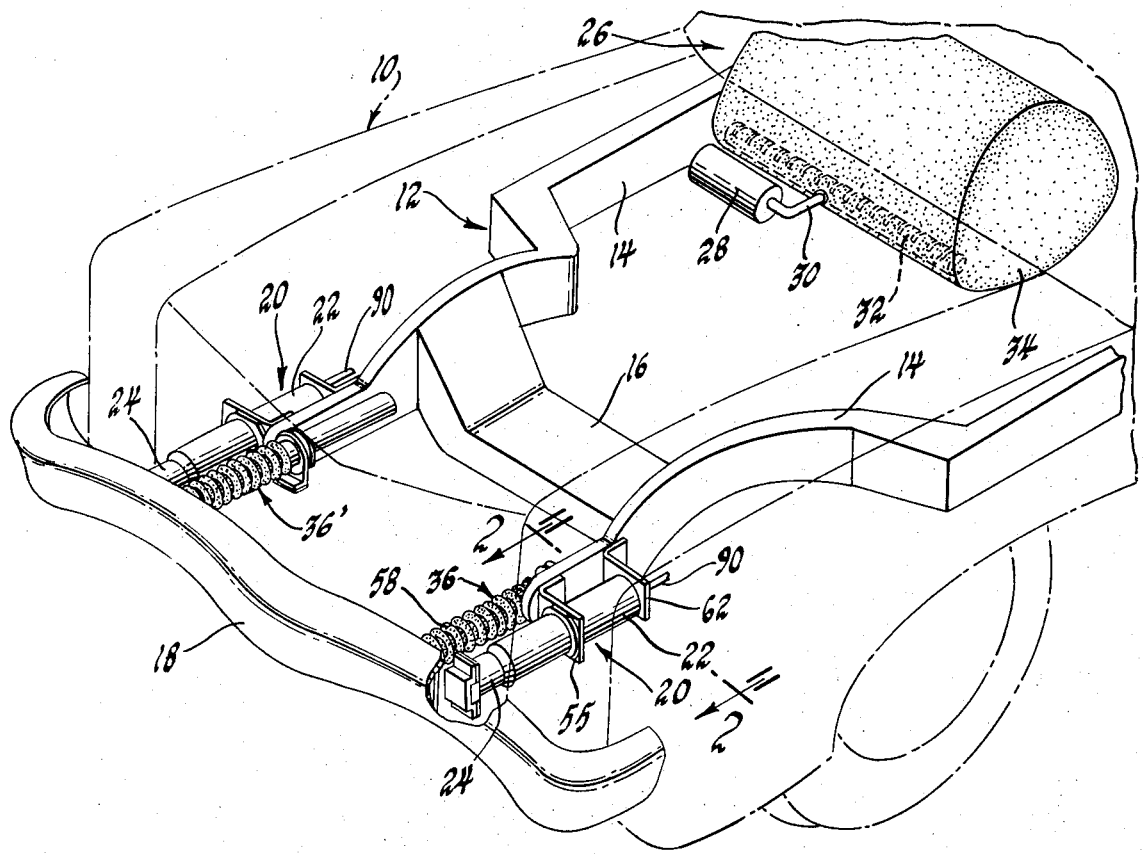

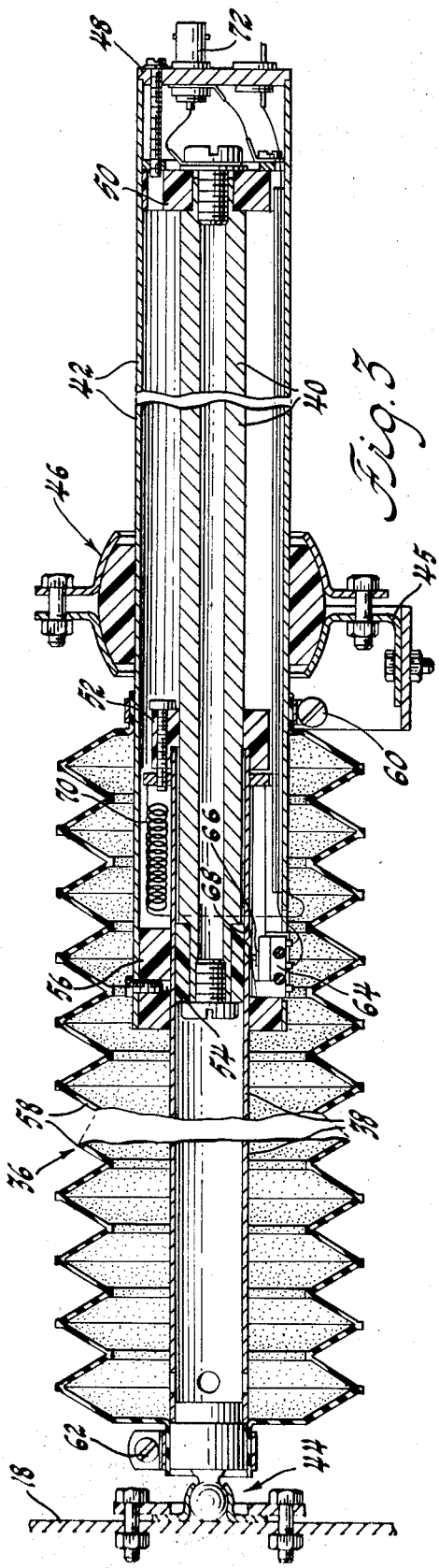

VARIABLE CAPACITOR CRASH SENSOR

This invention relates generally to inflatable occupant restraint systems and more particularly to a control system for actuating an inflatable cushion prior to the vehicle deformation resulting from impact forces exceeding the energy absorption limit of the vehicle energy absorbing bumper system.

Conventional inflatable occupant restraint systems include a source of pressure fluid for communication with an inflatable cushion. The pressure fluid source is communicated to the cushion by rupture of a pressure vessel seal. Rupture of the seal may be initiated by electrically operated actuator means such as a squib which is energized from a source of electrical power under the control of one or more mechanical impact switches or accelerometer means.

It is well known to mount bumpers or other impact bars on vehicles by energy absorbing devices which absorb the energy of impact forces by the displacement of a medium between variable volume chambers. Such energy absorbing devices can only absorb the energy of the impact forces up to a predetermined absorption limit. When this limit is reached or exceeded the device loses structural integrity and deformation of the vehicle will occur.

It is an object of the present invention to provide an electronic system for actuating an inflatable cushion in a vehicle in the event of a collision exceeding a predetermined velocity and for initiating inflation of the cushion at a time which is prior to vehicle deformation and dependent on the impact velocity.

In accordance with the present invention an electromechanical sensor is mounted between the frame of the vehicle and the impact bar. The capacitance of the sensor changes as the distance between the impact bar and the vehicle frame changes. The capacitance of the sensor is detected by control circuitry which converts the capacitance to a dc signal which is differentiated to determine the velocity of the impact bar relative to the vehicle frame. When a predetermined velocity is exceeded for an interval of time a control signal is developed for firing the actuator for initiating inflation of the cushion. The time interval decreases with increasing impact velocity. The system also includes means for inhibiting firing of the actuator from extraneous noise pulses or transients in the power supply.

Other objects and advantages of the present invention will be apparent from the following detailed description which sould be read in conjunction with the drawings in which:

FIG. 1 is a partial perspective view of a vehicle body embodying an inflatable occupant restraint system according to the present invention;

FIG. 2 is a sectional view taken along lines 2—2 of FIG. 1;

FIG. 3 is a sectional view of the variable capacitance sensor employed in the present invention;

FIG. 4 is a functional block diagram of the system;

FIG. 6 shows the waveform output of the multivibrator employed in FIG. 4.

Figure 5:
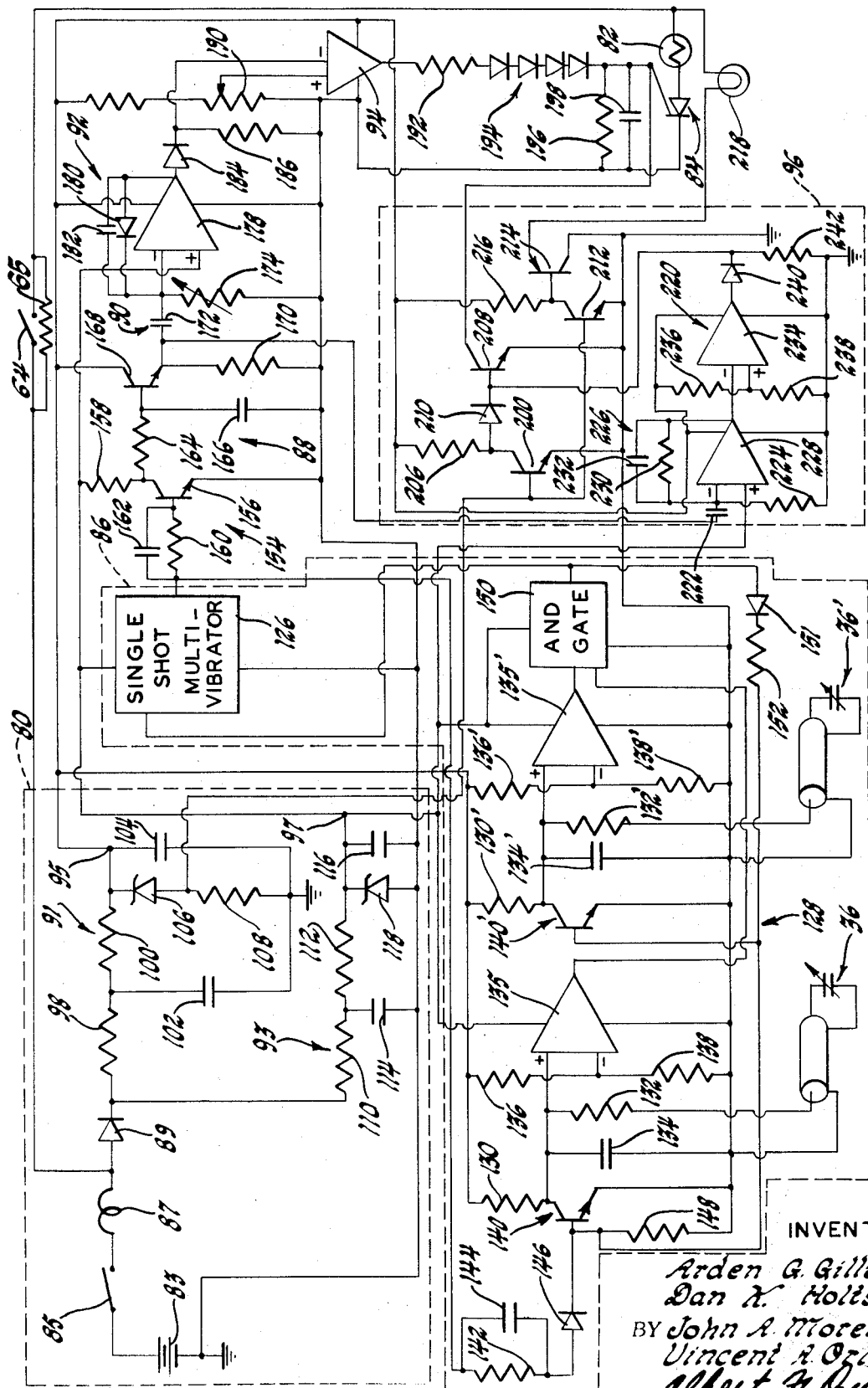
FIG. 5 is a detailed schematic diagram of the system.

Referring now to the drawings and initially to FIGS. 1 and 2, a vehicle body generally designated 10 and being of either the body-frame type or of the integral body type includes a frame or frame extension 12 having a pair of forward frame rails 14. Such rails are of conventional structure and are interconnected adjacent their free ends by front frame cross member 16. A bumper or impact bar 18 extends across the front of the vehicle 10 and is supported thereon by a pair of like energy absorbing devices 20.

Each of the devices 20 includes an outer cylindrical member 22 and an inner cylindrical member 24 which are telescopically arranged. The member 22 is attached to the frame rail 14 while the member 24 is secured to the impact bar 18. The specific details of the device 20 are not necessary for understanding the present invention, and therefore, in the interest of brevity will not be described further. Details of such devices may be obtained from copending application Ser. No. 91,008, Jackson et al., filed Nov. 19, 1970 and assigned to the assignee of the present invention.

A conventional inflatable occupant restraint system generally designated 26 is mounted on the vehicle. The system includes a pressure vessel 28 containing air under pressure and having an outlet sealed by a rupturable diaphragm, not shown, the rupture of which is initiated by electrically fired detonators, not shown. The sealed pressure vessel 28 communicates with a manifold 30 and a diffuser 32 both of conventional structure. An inflatable cushion 34 for the center and right front seat passengers of the vehicle 10 is inflated from the diffuser in a conventional manner. The cushion 34 is shown inflated for purposes of clarity only. Reference may be had to Ser. No. 36,080, Clove et al., filed May 11, 1970, now U.S. Pat. No. 3,618,978, and assigned to the assignee of the present invention, for the details of the manner in which the cushion is normally stored and inflated.

Mounted between the impact bar 18 and the frame rails 14 are identical capacitive sensors 36 and 36'. The capacitive sensor 36 is shown in FIG. 2 and includes a cylindrical plunger 38 and inner and outer cylindrical members 40 and 42. The plunger 38 is mounted to the impact bar 18 through a spherical mounting generally designated 44, while the member 42 is mounted by bracket 45 to the frame rail 14 through a spherical mounting generally designed 46. The mountings 44 and 46 permit limited non-axial movement of the plunger 38 relative to the members 40 and 42 to prevent jamming during impact. The member 42 is closed at one end by a cover 48. The inner member 40 is located within the member 42 by a support 50 which electrically insulates the member 40 from the member 42. The plunger 38 carries a bearing 52 which slidably engages the member 40. The members 40 and 42 are provided with bearings 54 and 56 respectively which re slidably engaged by the plunger 38. The sensor 36 is protected from the environment by a boot 58 secured to the member 42 and plunger 38 by means of clamps 60 and 62. The member 42 carries a microswitch 64 having an armature 66 normally located in an opening 68 in the plunger 38 when the plunger 38 is in its fully extended and normal position. The armature 66 is actuated to close the microswitch upon a predetermined displacement of plunger 38 relative to member 42. The plunger 38 and the members 40 and 42 form a variable capacitor, the capacitance of which increases as the member 40 moves within the plunger 38. The plunger 38 and member 42 are electrically connected and grounded to the outer portion of a coaxial connector 72 and through the vehicle frame in order to form a high frequency shield to prevent electrical noise from entering the capacitor. The member 40 is connected with the inner portion of the connector 72 for connection with a source of voltage. The plunger 38 is also electrically connected to the member 42 through a conductive spring 70 which insures that the plunger 38 and the member 42 remain at the same potential. The plunger 38 and the member 40 thus form a first capacitor which is electrically connected in parallel with a second capacitor formed by the members 40 and 42. Movement of the member 40 within the plunger 38 increases the capacitance of the first capacitor while decreasing the capacitance of the second capacitor. However, the gap between the plunger 38 and the member 40 is substantially less than the gap between the members 40 and 42 so that the total effect of inward movement of the member 40 is to increase the capacitance of the sensor 36 as measured at connector 72.

Referring now to FIG. 4, a functional block diagram of the control circuitry for initiating air cushion inflation is shown and includes a power supply 80 which supplies current to an actuator 82 under the control of a silicon controlled rectifier (SCR) 84. The circuitry for firing the SCR 84 includes a variable duty cycle multivibrator generally designated 86 which produces a substantially rectangular output wave whose ratio of on-time to off-time is proportional to the capacitance of whichever one of the sensors 36, 36' exhibits the largest capacitance. The output of the multivibrator 86 is averaged by a filter 88 which provides a dc output signal proportional to the capacitance and consequently proportional to the position of the impact bar 18 relative to the frame 14. The position information output of the filter 88 is fed to a differentiator 90 which develops an output proportional to the velocity of the impact bar 18 relative to the frame 14. The output of the differentiator 90 is connected with an integrator 92. The integrator 92 does not integrate until a predetermined threshold velocity has been reached after which the integration process begins. A detector 94 senses the output of the integrator 92 and fires the SCR 84 provided the output of the integrator 92 remains for a time interval dependent on the impact velocity. An inhibit circuit 96 senses the voltage in the power supply 80 and inhibits firing of the SCR during turn-on and turn-off of the power supply when transients occur that could cause an unintentional firing of the SCR 84. The inhibit circuit 96 is also connected with the output of the filter 88 and inhibits the SCR 84 whenever an abnormally large velocity is detected, such as might occur as a result of spurious signals in the circuit.

Referring now to FIG. 5, a more detailed schematic diagram of the system is shown. The power supply 80 includes the 12 volt vehicle battery 83 which is connected through an ignition switch 85, a choke 87, and a diode 89 to a pair of networks 91 and 93, which maintain first and second regulated voltages at the junctions 95 and 97 respectively. The network 91 comprises a filter including resistors 98, 100 and capacitors 102, 104. A zener diode 106 is connected in series with a resistor 108 which regulates the voltage at the junction 95. The network 93 comprises a filter including resistors 110, 112 and capacitors 114, 116. A zener diode 118 regulates the voltage at the junction 97.

The electrically operated actuator or squib 82 is connected across the battery 83 through the ignition 85, the choke 87, the microswitch 64, and the anode/cathode electrodes of the SCR 84. A resistor 65 is connected in parallel with the microswitch 64.

The variable duty cycle multivibrator 86 comprises a conventional monostable or single shot multivibrator 126 connected between the junction 97 and ground. The single shot 126 is triggered to its semistable state from a trigger circuit generally designated 128. The single shot 126 remains in its semistable state for a fixed duration whereupon it returns to its stable state. The interval of time during which the single shot 126 remains in its stable state is dependent upon the capacitance of the sensors 36, 36' and more specifically that sensor which exhibits the largest capacitance. The sensor 36 is connected between ground and the junction 95 through a relatively large charging resistor 130 and a relatively small resistor 132. A capacitor 134 is connected in parallel with the capacitor 36 and resistor 132. A resistor 132 and capacitor 134 provides an impedance match for the cable connecting the sensor 36 with the control circuitry. A voltage comparator 135 is connected between the junction 97 and ground and has a reference voltage established at its inverting input by voltage dividing resistors 136 and 138 connected between the junction 95 and ground. The non-inverting input to the comparator 135 is connected to ground through the resistor 132 and the sensor 36. A transistor 140 has its emitter grounded and its collector connected to the resistor 130. The base of transistor 140 is connected to the output of the single shot 126 through a current limiting resistor 142, a speed up capacitor 144 and a diode 146 and to ground through a resistor 148. The sensor 36' is connected with similar circuitry to that previously described with regard to sensor 36. Corresponding components are designed by prime numbers. The outputs of the comparators 135 and 135' provide the two inputs to an AND gate 150. The output of the AND gate 150 is connected to the trigger input of the single shot 126. The output of the AND gate 150 is also connected through a diode 151 and a resistor 152 to the base of transistors 140 and 140' to insure starting of the multivibrator 86.

When the voltages at the inverting input of the comparators 135 and 135' are exceeded by the voltage developed across the sensors 36 and 36' respectively, the AND gate 150 is enabled and triggers the single shot 126 which provides an output of fixed duration as shown in FIG. 6. During this time the output of the single shot 126 renders the transistors 140 and 140' conductive to discharge the sensors 36 and 36' respectively. When the single shot 126 times out and reverts to its stable state, the sensors 36 and 36' begin to charge again through the resistors 130, 132 and 130', 132' respectively. Under normal non-collision conditions the single shot 126 produces a substantially rectangular wave output having a fixed on-time of 1 microsecond and an off-time of approximately 0.5 microseconds. Since the single shot 126 cannot be triggered until both comparators 135 and 135' have switched, the time interval during which the single shot 126 is in its stable or off state during a collision is dependent on the sensors 36 or 36' exhibiting the largest capacitance and therefore, experiencing the greatest relative velocity between the impact bar 18 and the frame 14. The variable off-time of the single shot 126 is not dependent on power supply voltage variations because both of the RC networks as well as the voltage reference networks for the comparators 135 and 135' are connected to the junction 95. If the junction 95 decreases for instance, the reference level decreases but the voltage to which the RC network charges also decreases causing the off-time of the single shot 126 to remain unchanged for a given capacitance.

The output of the multivibrator 86 is inverted by an inverter buffer stage generally designated 154 comprising a transistor 156. The transistor 156 has its emitter grounded, its collector connected to the junction 97 through a resistor 158 and its base connected to the output terminal of the single shot 126 through a current limiting resistor 160 and a speed-up capacitor 162.

The filter 88 comprises a resistor 164 and a capacitor 166 and is connected across the collector/emitter electrodes of the transistor 156 and converts the rectangular wave output from the buffer stage 154 to an average dc level. The filter 88 is connected to an emitter follower buffer stage comprising a transistor 168 and a resistor 170.

The differentiator network 90 comprises capacitor 172 and a variable resistor 174 connected across the emitter follower resistor 170. The current through the capacitor 172 is the differential of the input voltage and is proportional to impact velocity or relative velocity between the impact bar 18 and the vehicle frame 14. The integrator 92 comprising an operational amplifier 178 having its inverting input terminal connected to the junction between the capacitor 172 and the resistor 174 and its non-inverting input terminal connected to the junction 97. A diode 180 and an integrating capacitor 182 connect the output of the comparator 178 to the inverting input terminal. The current from the output of the amplifier 178 through the diode 180 and resistor 174 maintains the voltage at the inverting input terminal equal to the voltage at the non-inverting input terminal. When current flow through the differentiating capacitor 172 is sufficient to maintain the voltage at the inverting put terminal of the amplifier 178 equal to that established at the non-inverting input of the amplifier 178, the diode 180 is back biased and current flow commences through the integrating capacitor 182. The resistor 174 establishes the velocity threshold which must be exceeded before the integration process begins. No current flows through the capacitor 182 until current flow through the capacitor 172 is indicative of a velocity greater than that set by the variable resistor 174. When the integration process begins the voltage output of the amplifier 178 begins to decrease. The rate of decrease of the output voltage is dependent on the current flow through the capacitor 182 and consequently the magnitude of the impact velocity.

The output of the amplifier 178 is connected to ground through a diode 184 and a resistor 186. The voltage developed across the resistor 186 is applied to the inverting input terminal of the detector or voltage comparator 94. The non-inverting input to the comparator 94 is connected to a variable resistor 190 which establishes a reference level below which the output of the amplifier 178 must drop in order to cause the comparator 94 to switch. The time interval which must elapse subsequent to the detection of an input velocity exceeding the threshold velocity before switching of the comparator 94 can occur is thus dependent on both the value of the resistor 190 and the magnitude of the impact velocity. For a particular value of resistance of resistor 190 the time interval decreases with increasing impact velocity. The output of the comparator 94 is fed through a current limiting resistor 192 and a plurality of voltage dropping diodes 194 to the gate electrode of the SCR 84. When the comparator 94 switches the SCR 84 is fired. A noise filter comprising a resistor 196 and a capacitor 198 is connected across the gate and anode electrodes of the SCR 84.

The inhibit circuitry 96 comprises a transistor 200 having its collector connected to the junction 95 through a resistor 206, its emitter grounded and its base connected to the junction between the zener diode 106 and the resistor 108. The collector of the transistor 200 is connected to the base of a transistor 208 through a diode 210. The transistor 208 has its emitter grounded and its collector connected to the gate electrode of the SCR 84. When power is initially applied to the system by closure of the ignition switch 85 the transistor 208 is rendered conductive from the junction 95 through the resistor 206 and diode 210 thus grounding the gate electrode of the SCR 84. As the power supply 80 reaches its operating voltage the zener diode 106 will conduct sufficient base drive current through the transistor 204 to render this transistor conductive which robs base current from the transistor 208 rendering it nonconductive and thereafter permitting the SCR 80 to be fired. By inhibiting the SCR 84 during turn-on of the system, transients which build up in the power supply are prevented from inadvertently firing the SCR 84. The junction between the zener diode 106 and resistor 108 is also connected to a second pair of transistors 212 and 214. The transistor 214 is rendered conductive through the resistor 216 when the system is initially turned on to energize an indicator lamp 218 through the resistor 65. When the power supply is stabilized the transistor 212 is rendered conductive to turn off the transistor 214 and extinguish the indicator lamp 218.

The transistor 208 is also connected with circuitry generally designed 220 which renders the transistor 208 conductive thereby inhibiting operation of the SCR 84 whenever a velocity input is detected which is greater than that which is reasonably expected such as might occur as a result of momentary open circuit in the connections to the 36, 36'. The circuitry 220 includes a differentiator network comprising a capacitor 222 and a resistor 224 connected across the emitter follower resistor 170. An integrator 226 comprising an amplifier 228 has its inverting input connected to the differentiating capacitor 222 and its non-inverting input connected to the junction 97. The output of the amplifier 228 is connected through a resistor 230 in parallel with an integrating capacitor 232 to the inverting input of the amplifier 228. The output of the amplifier 228 is fed to the inverting input of a voltage comparator 234 having its non-inverting input connected to a junction between voltage dividing resistors 236, 238. The output of the voltage comparator 234 is connected through a diode 240 to the base of transistor 208 and through a resistor 242 to ground. The integrator 226 and voltage comparator 234 operate similarly to the integrator 92 and voltage comparator 94 previously described. The resistor 224 establishes a threshold velocity input to the amplifier 228 at some predetermined value, for example, 75 mph. Any input to the amplifier 228 representing a velocity above 75 mph will cause the voltage comparator 224 to switch and render the transistor 208 conductive to inhibit the SCR 84.

The overall operation of the system is as follows:

When the ignition switch 85 is closed the transistors 208 and 214 are rendered conductive to inhibit the SCR 84 and energize the lamp 218. When the power supply 80 has stabilized, the lamp 218 is extinguished and the inhibit is removed from the gate of the SCR 84. The single shot 126 produces a substantially rectangular wave output due to the alternate charging and discharging of the sensors 36 and 36'. Under normal conditions the capacitance of the sensors 36 and 36' is constant at a fixed value which establishes an off-time for the single shot 126 of approximately one-half the on-time. The output of the single shot 126 is inverted by the buffer stage 154 and filtered by the filter 88 to established an averaged dc input voltage to the differentiator 90. The current through the differentiating capacitor 172 and resistor 174 is insufficient to back bias the diode 180 in the integrator 92 so that no current flows through the integrating capacitor 172. Consequently, the voltage at the inverting input of the voltage comparator 94 is greater than the reference voltage established at the non-inverting input of the voltage comparator 94 and no trigger voltage is applied to the gate of the SCR 84. During a collision, the microswitch closes and the capacitance of both sensors 36 and 36' increases, increasing the time necessary to charge the sensors 36 and 36' to a voltage sufficient to switch the comparators 135 and 135' which has the effect of lengthening the off-time of the single shot 126. Thus the ratio of on-time to off-time of the single shot 126 is decreased. Since the triggering of he single shot 126 is dependent on sensors 36 and 36' being charged above the reference voltage established at the comparators 135 and 135' respectively, the triggering of the single shot 126 is under the control of the sensor 36, 36' exhibiting the largest rate of change of capacitance. As the capacitance of the probe 36, 36' increases so does the dc level at the input to the differentiator 90. If the impact velocity as represented by the changing dc level is greater than the threshold velocity established by the resistor 174 in the differentiator network 90 the diode 184 is back biased and current begins to flow through the integrating capacitor 182. If the velocity of impact is below the threshold established at the resistor 174 the diode 180 remains forward biased and no current flows through the integrating capacitor 182. The time required for the voltage across the resistor 186 to drop below the reference voltage established by the resistor 190 is dependent on the velocity of impact. When the voltage across the resistor 186 drops below the voltage established by the resistor 190 the voltage comparator 94 switches triggering the SCR 84 and firing the squib 82. Thus the squib 82 is fired only if the microswitch 64 has closed and the threshold velocity is exceeded for a certain interval of time, which interval of time is dependent on the impact velocity. The movement of the impact bar 18 relative to the frame 16 which is required in order to close the microswitch 64 prevents actuation of the squib 82 from a short duration high velocity impact which causes little or no relative movement between the impact bar 18 and the frame 16. In addition to the above enumerated requirements for firing the squibs 82 the circuitry 220 prevents firing of the SCR 84 in the event of the detection of an unreasonably high input velocity resulting from malfunctioning of the sensors 36, 36' or other spurious signals introduced in the circuitry.

Having thus described my invention what we claim is:

1. In a passenger conveyance the combination comprising an inflatable cushion, electrically operated actuator means for inflating said cushion;

variable capacitance impact sensor means mounted on said vehicle and comprising members which are relatively displaceable upon impact of said vehicle to vary the capacitance of the sensor means in proportion to the relative displacement of said members;

means for converting the capacitance of said sensor means to a signal proportional to the relative velocity of said members;

means responsive to said signal for operating said actuator means an interval of time after the relative velocity of said members exceeds a predetermined velocity.

2. In an automotive vehicle the combination comprising, a source of pressure fluid, an inflatable cushion, electrically operated actuator means for communicating the cushion with said source, a bumper impact bar receptive to impact forces, energy absorbing means supporting the impact bar on the vehicle frame;

variable capacitance impact sensor means mounted between said impact bar and said vehicle frame, said sensor means exhibiting a change in capacitance in response to a change in the relative distance between the impact bar and the vehicle frame;

means responsive to the capacitance of said sensor means for developing a signal proportional to the relative velocity of said impact bar and said vehicle frame;

means responsive to said signal for operating said actuator means an interval of time after the said relative velocity exceeds a predetermined velocity.

3. The combination defined in claim 2 wherein said sensor means comprises an outer cylindrical member mounted to said frame and having an axis, an inner cylindrical member supported within said outer member in axial alignment therewith and electrically insulated therefrom, means for connecting said inner member to a source of potential, a cylindrical plunger mounted at one end to said impact bar, bearing means mounting the other end of said plunger for axial movement between said inner and outer members, said inner member and said plunger forming a first capacitor, said inner and outer members forming a second capacitor electrically in parallel with said first capacitor the total capacitance of which increases as the distance between the impact bar and the vehicle frame decreases.

4. The combination defined in claim 3 further comprising a normally open switch supported by said outer member and including an armature normally biased to the open position and movable to the closed position in response to relative movement of said plunger and said outer member, means connecting said switch in series with said actuator means to inhibit operation of said actuator means until said switch is closed.

5. In an automotive vehicle the combination comprising, a source of pressure fluid, an inflatable cushion, electrically operated actuator means for communicating the cushion with said source, a bumper impact bar receptive to impact forces, energy absorbing means supporting the impact bar on the vehicle frame;

variable capacitance impact sensor means mounted between said impact bar and said vehicle frame, said sensor means exhibiting a change in capacitance in response to a change in the relative distance between the impact bar and the vehicle frame;

multivibrator means including said sensor means and producing a substantially rectangular output wave whose ratio of on-time to off-time is proportional to the capacitance of said sensor means;

means for averaging the output of said multivibrator means to produce a dc signal proportional to the capacitance of the sensor means;

differentiator means responsive to said dc signal to provide a signal proportional to the velocity of impact;

means responsive to the output of said differentiator means for operating said actuator means an interval of time after the velocity of impact exceeds a predetermined velocity.

6. In an automotive vehicle the combination comprising, a source of pressure fluid, an inflatable cushion, electrically operable actuator means for communicating the cushion with said source, a bumper impact bar receptive to impact forces, energy absorbing means supporting the impact bar on the vehicle frame, a plurality of electro-mechanical sensor means mounted between said impact bar and said vehicle, each sensor means forming a capacitor and each capacitor exhibiting a change of capacitance as the relative distance between the impact bar and the vehicle frame changes;

variable duty cycle multivibrator means including each of said capacitors and producing a substantially rectangular wave whose ration of on-time to off-time is proportional to the capacitance of the capacitor exhibiting the largest capacitance;

means for averaging the output of said multivibrator means to produce a dc signal proportional to the position of said impact bar relative to said vehicle frame;

differentiator means for differentiating said dc signal to provide a signal proportional to the velocity of said impact bar relative to said vehicle frame;

integrator means connected to said differentiator means and operative to develop a control voltage when the velocity of said impact bar relative to said vehicle frame exceeds a predetermined velocity, said control voltage attaining a predetermined magnitude in a time interval dependent on the impact velocity;

voltage detector means for operating said actuator means in response to said control voltage attaining said predetermined magnitude.

7. The combination defined in claim 6 wherein said variable duty cycle multivibrator means comprises a source of voltage, resistance means connected in series with each of said sensor means respectively across said source, voltage comparator means producing respective outputs when respective ones of said sensor means are charged above a reference voltage, AND function performing logic means responsive to the outputs of each of said comparators for providing a trigger pulse when all of said sensor means have charged above the respective voltage references, a monostable multivibrator triggerable to its semistable state by the output from said gate means, means responsive to the output of said monostable multivibrator for discharging said sensor means during the semistable state of said multivibrator whereby the time duration of the stable state of said multivibrator is determined by the capacitance of the larger of said plurality of sensor means.

* * * * *